April 30, 1929.  T. G. McDOUGAL  1,710,995
CONTINUOUS TUNNEL KILN
Filed March 11, 1925
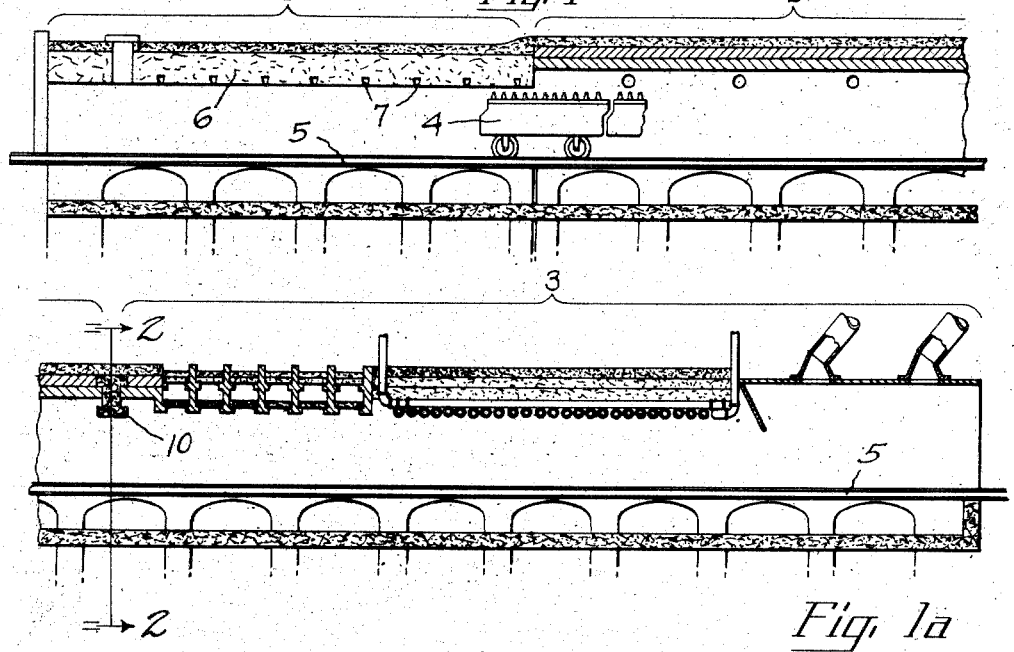
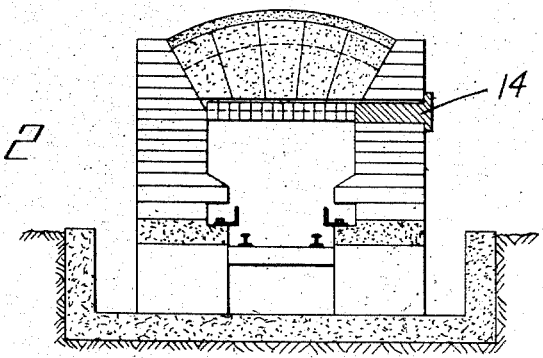
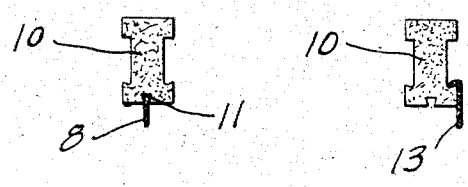
Inventor
Taine G. McDougal
Attorneys Patented Apr. 30, 1929.

1,710,995

UNITED STATES PATENT OFFICE.

TAINE G. McDOUGAL, OF FLINT, MICHIGAN, ASSIGNOR TO A C SPARK PLUG COMPANY, OF FLINT, MICHIGAN, A COMPANY OF MICHIGAN.

CONTINUOUS-TUNNEL KILN.

Application filed March 11, 1925. Serial No. 14,745.

This is an improvement on the invention disclosed in my Patents Nos. 1,416,726 and 1,416,727 granted May 23, 1922.

As set forth in said patents my process of burning ceramic wares consists in continuously passing said wares through a tunnel kiln containing a preheating zone, a high temperature zone, and a cooling zone. The preliminary heating is done in the preheating zone. In the high temperature zone the wares are exposed to the direct action of the intense heat produced by the substantially flameless combustion of pre-mixed air and fuel, the products of combustion passing outwardly through the preheating zone and serving as the heating means therefor. Beyond the high temperature zone and separated from it by a baffle is a cooling zone where the wares are subjected to decreasing temperatures preparatory to their discharge. Thus the wares are exposed to temperatures varying from a minimum at the tunnel entrance, increasing as the seat of combustion is approached, reaching a maximum in the high temperature zone and again decreasing throughout the cooling zone.

In the practical operation of kilns embodying the features herein briefly referred to and set forth more at length in my prior patents, it was found that the speed with which the ware could be fed into the kiln was limited to that speed below which no cracked ware would result. The more intricate the shape of the ware the more prolific was the cracking defect for any given rate of feed.

It is a primary object of the present invention to improve the continuous kiln method of burning ceramic wares by eliminating the conditions which have heretofore resulted in a high percentage of fractures requiring for remedy an uneconomical increase in the time of firing.

Now it was heretofore known that there is a certain stage in the burning of ceramic wares between the temperatures of 932° F. and 1292° F. which is very critical inasmuch as the clay shapes between these temperatures are in the process of losing water of crystallization from the clay bond and are weaker mechanically than at any other time during their processing. It is especially inadvisable at or near this stage of the burning process to allow the ware to be subjected to a sudden rise in temperature. In an effort to ascertain whether the wares were subjected to any such sudden increase in temperature in the continuous kiln process as heretofore carried out, a thermo-couple was passed up through the refractory bottom of the travelling car used for conveying the ware through the kiln so that the head of the thermo-couple occupied the same position as a piece of ware and it was thus carried throughout the length of the kiln. The thermo-couple was connected with a recording pyrometer. It was discovered that at periodic intervals in the preheating zone the pyrometer recorded sudden increases in rate of temperature rise followed by a short period in which no rise occurred. It was found that these violent fluctuations occurred when the thermo-couple was passed under one of the widely separated drop arches or baffles of the kiln, clearly shown at 9 in Figure 1 of my Patent 1,416,726. These drop arches or baffles, it may be explained, are an outgrowth of the common form of continuous kiln construction heretofore used. For convenience and economy in erection it had previously been the practice to construct kilns for continuous work of arch formation. This carried with it the disadvantage that in the preheating zone the hot gases would travel along the vault of the arch and would be ineffective to give the required preparatory heating to the ware, and it was therefore necessary to make use of drop arches or baffles. As will be apparent by reference to my prior patent, the upper parts of these drop arches were of a radius to conform to the brick arch construction spanning the width of the kiln opening on certain rowlocks of which they were partially suspended. The bottoms of these arches were in a horizontal plane parallel to the tops of the conveying means passing through the tunnel and served as baffles to deflect the hot gases emerging from the high temperature chamber down upon the ware in the preheating zone.

Accordingly, an object of my improvement is, specifically, to so construct a continuous tunnel kiln as to avoid the violent fluctuations in temperature heretofore encountered. In the embodiment of the invention herein disclosed, I have accomplished this object by the elimination of the said widely spaced drop arches or baffles and the substitution therefor of a substantially continuous drop arch. Such substantially continuous drop arch may take the form of a smooth and unobstructed surface thus insuring uniformity in heat distribution and a smoothly tapering heat drop throughout the passage.

As a further object of my invention, I have devised means for adapting a continuous kiln to the burning of ceramic objects of varied sizes. One means of accomplishing this object consists in the provision of devices to control the passage of heated gases through the kiln in order that they may effectively impinge upon the articles to be treated, said means being adjustable to accommodate the heat flow to articles of different sizes. Specifically this means consists of removable baffles of refractory material preferably arranged on the under side of the roof of the kiln. It will be evident that these baffles, when used, constitute, in effect, so far as heat distribution is concerned, a substantially continuous drop arch for the humps in the temperature gradient become of correspondingly diminishing magnitude as the number of baffles is increased and hence this construction comes within the broad scope of the object of invention first stated.

As a further object of my invention in adapting a kiln of this type to the burning of ceramic wares of different sizes, I have provided means for adjustment of the baffles customarily used between the high temperature zone and the cooling zone, although it is obvious that this phase of my invention may find application in other relations. Specifically, this means consists in the provision of auxiliary baffles constituted by thin plates of refractory material which may be used interchangeably to increase the effective area of the baffle.

Other and further objects of my invention will appear from the following description.

In the drawings:

Figures 1 and 1ª are central, vertical, longitudinal sections each showing substantially one half the length of the kiln, Figure 1 being at the charging end;

Figure 2 is a section on line 2—2 of Figure 1ª;

Figure 3 is a section of one form of baffle while Figure 4 discloses a modification.

The showing of the drawing is of course merely illustrative of one form of construction of kiln which may be employed and may be varied as desired. In this embodiment, 1 indicates the preheating zone, 2 the high temperature zone, and 3 the cooling zone. As the temperature in these three zones, except as otherwise herein stated, is maintained and controlled in substantially the same manner as set forth in my prior Patent 1,416,726, no description of the means employed for these purposes will be given. At 4 are shown the usual cars carrying the ceramic wares and travelling upon the tracks 5.

It will be observed upon reference to Figure 1 that the construction of the preheating zone of the tunnel is such that substantially uniform clearance is maintained between the roof of the tunnel and the cars, thus insuring uniformly tapering heat variation throughout this portion of the passage. In the form shown in this figure, this object is attained by providing this section of the tunnel with a roof consisting of a flat slab 6 of heat insulating and refractory material.

The material used in the construction of this slab must satisfy the conditions that it be light in weight and of refractory heat insulating composition and at the same time sufficiently strong to support itself undistorted throughout the range of temperature to which it is subjected. I have found by extensive experimentation that a mixture of calcined diatomaceous earth (kieselguhr) with Portland cement in the proportion by weight of 138 parts kieselguhr to 100 parts of cement will produce a composition which will provide the desired characteristics and be serviceable for temperatures below approximately 1600° F. Of course it is to be understood that broadly my invention is not limited to the use of this particular material if other suitable compositions may be subsequently discovered.

While in this embodiment of the invention I have shown the use of a tunnel construction which promotes uniform nonfluctuating temperature variations only in the preheating zone, it is to be understood that its applicability is not to be so limited but that this same means may be effectively employed wherever it is found desirable to provide for a uniform temperature gradient in the treatment of articles.

It will be observed that the under surface of the slab 6 is provided with guide-ways 7 constituting engaging means for the reception of plates 8 of refractory material, one of which is shown in Figure 3. A series of these plates is provided, graduated in size. They are to be used interchangeably and their function is to reduce the effective clearance between the cars and the roof of the tunnel so that the kiln may be used with articles of different sizes, as stated heretofore in the objects of the invention. It will be observed that these baffles are closely spaced with consequent reduction in the temperature drop between them. Owing to this fact and to the further fact that the extent of projection of the baffles into the tunnel is slight compared with the extent of projection of the baffles 9 in my prior patent, the humps in the temperature gradient are reduced and the construction becomes the equivalent of a substantially continuous drop arch thus avoiding the objectionably violent changes in temperature found to exist under prior practices.

While I have shown the application of baffles to the top wall roof only of the tunnel it is to be understood that their use is not so limited but they may be applied wherever it is desired to control the flow of the heated gases for the purposes stated.

As in the construction in my prior Patent 1,416,726 it will be observed by reference to Figure 1ᵃ of this application that I have provided a baffle 10 between the high temperature zone and the cooling zone. In order to provide for adjustment of this baffle in conformity with conditions imposed by the burning of different sized wares, I have provided it with adjusting means of substantially the same character as disclosed in Figure 1 in connection with the preheating zone, that is, I have provided the under side of the baffle with a guide-way 11 in which are slidably received thin plate-like supplemental baffle members 8, as more clearly shown in Figure 3.

As an alternative method I have shown in Figure 4 the baffle 10 provided with a groove or ledge upon its side upon which are hooked the upper ends of plate-like supplemental baffle members 13 of the same material and performing the same functions as plates 8. It will be noted that these plates 13 are located on the discharge side of the main baffle member 10 with the resultant advantage that in the case of a jamming of wares in passing through the tunnel the baffle will be merely lifted off its support and carried along with the wares without damage to the permanent tunnel structure.

As will be observed by reference to Figure 2, the placing in position of these supplemental baffle members 8, whether used in the preheating zone or between the high temperature zone and the cooling zone, is facilitated by the provision of an opening 14 in the tunnel wall opposite the guideway which is to receive them. After they have been properly positioned these openings are temporarily filled in to avoid loss of heat. By this means the refractory pieces can be inserted from outside of the kiln without interrupting its operation.

Where I have made use of the phrase "continuous tunnel kiln" it is to be understood that I have reference to a tunnel kiln in which the continuous process of burning is employed and which may or may not be in the form of a continuous or closed curve.

Where I have referred to one of the walls as constituting a heat reflecting surface it is to be understood that the phrase does not have reference to reflection by radiation only but also to the control of heat through the control of the passage of heated gases through the tunnel.

While I have shown and described one illustrative embodiment of my invention, it is to be understood that I am not to be limited thereby, but only to the extent called for by the terms of the appended claims.

I claim:

1. In a continuous tunnel kiln for burning ceramic wares, having a zone of graduated heat treatment in which the wares are subjected to the direct action of hot combustion gases, means for transporting wares through the kiln, said wares being arranged in substantially single tier formation, said tunnel having substantially unbroken uniplanar walls throughout said zone, said means and tunnel being so arranged as to permit the passage of a substantially unbroken stream of gases therethrough in a direction opposite to the direction of travel of the wares and in a path substantially parallel thereto, so as to promote a steady non-fluctuating rate of temperature change throughout the said zone of graduated heat treatment.

2. In a continuous tunnel kiln for burning ceramic wares by subjecting said wares to direct contact with hot combustion gases, said kiln having a zone of graduated heat treatment, one of the walls of said tunnel functioning chiefly as a heat reflecting surface, means moving through the said kiln for carrying wares being burned therein, said wall being uniplanar so as to provide uniform clearance between the heat reflecting surface and the wares throughout the zone of graduated heat treatment for the passage of hot gases in a direction substantially parallel to the path of the wares thereby subjecting the wares to steady non-fluctuating temperature variations.

3. A continuous tunnel kiln for burning ceramic wares comprising, in part, a graduated heat treatment zone through which pass hot gases in direct contact with the wares, said zone being provided with a flat uniplanar roof of highly refractory material serving as the main heat reflecting surface and means for passing wares in single tier formation through said tunnel, said tunnel and wares being so arranged as to afford substantially uniform clearance between said wares and the said heat reflecting surface throughout the said graduated heat treatment zone.

4. A continuous tunnel kiln for burning ceramic wares including a pre-heating zone, a high temperature zone, and a cooling zone, means for passing a stream of hot gases through said pre-heating zone in contact with said wares in a direction opposite to that in which the wares travel through said kiln and substantially parallel thereto, the portion of the tunnel serving as the preheating zone being provided with a uniplanar roof of refractory material affording substantially uniform clearance between said roof and the wares passing through said tunnel whereby to facilitate a steady nonfluctuating temperature rise throughout the critical period of heat treatment.

5. In a continuous tunnel kiln for burning ceramic wares, having a wall functioning as a heat reflecting surface, heat deflecting means adapted to be removably secured to said wall for varying the heat distribution along said wall.

6. In a continuous tunnel kiln for burning ceramic wares in which a stream of heated gases travels therethrough, means adapted to be secured to one of the walls of said tunnel for varying the clearance between said wall and the wares carrying means passing through said tunnel for deflecting the gases upon the wares thereon permitting the use of said tunnel kiln for articles of varying size.

7. In the combination as specified in claim 6, said last named means comprising interchangeable plates removably secured to said wall.

8. In the combination as specified in claim 6, said last named means comprising plates of refractory material slidably mounted in said wall.

9. In the combination as set forth in claim 6, said wall being provided with engaging means and one of the walls of said tunnel being adapted to be temporarily apertured in line with said engaging means to permit the introduction of said heat deflecting means into said tunnel and its connection with said engaging means.

10. A continuous tunnel kiln having zones for varying heat treatment and a baffle located between certain of said zones, said baffle being provided with means for adjusting the extent of its projection into said tunnel.

11. In the combination as set forth in claim 10, a portion of said baffle being provided with a guide-way and said means comprising plates having portions for engaging said guide-way.

12. In the combination set forth in claim 10, a portion of said baffle being provided with a guide-way facing toward the discharge end of said tunnel and said means comprising plates adapted to cooperate with said guide-way whereby in case the wares become jammed in passing through the tunnel said plate will be disengaged from said guide-way without damage to the tunnel structure.

13. A furnace wall element constituted of a composition of substantially 138 parts of kieselguhr to 100 parts of Portland cement.

14. In a continuous tunnel kiln for burning ceramic wares of the type in which the wares are subject to the direct action of gases for effecting temperature changes, and having a top wall or roof and a bottom or bed, means for passing wares therethrough, and means for varying the effective distance between the roof of said tunnel and said bed for deflecting gases upon the wares thereon adapting the tunnel for use with articles of varying size.

15. In a continuous tunnel kiln for burning ceramic wares having a pre-heating zone in which the wares are subjected to the direct action of hot combustion gases preparatory to burning, means for transporting wares through the kiln, adapted to support the wares in single tier formation, the kiln throughout said zone being provided with a flat uniplanar roof of refractory material providing substantially uniform clearance between the roof and the wares passing through the tunnel whereby to facilitate a steady temperature rise throughout the critical pre-heating treatment.

In testimony whereof I affix my signature.

TAINE G. McDOUGAL.